United States Patent
Toda et al.

(10) Patent No.: US 10,377,273 B2
(45) Date of Patent: Aug. 13, 2019

(54) VEHICLE SEAT

(71) Applicant: TACHI-S CO., LTD., Tokyo (JP)

(72) Inventors: Naoki Toda, Tokyo (JP); Atsushi Koike, Tokyo (JP); Takuto Ogawa, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 25 days.

(21) Appl. No.: 15/714,427

(22) Filed: Sep. 25, 2017

(65) Prior Publication Data

US 2018/0093590 A1 Apr. 5, 2018

(30) Foreign Application Priority Data

Oct. 4, 2016 (JP) .................................. 2016-196572

(51) Int. Cl.
*B60N 2/22* (2006.01)
*B60N 2/02* (2006.01)

(52) U.S. Cl.
CPC ......... *B60N 2/2213* (2013.01); *B60N 2/0232* (2013.01); *B60N 2/2245* (2013.01); *B60N 2002/0236* (2013.01)

(58) Field of Classification Search
CPC ...... B60N 2/0232; B60N 2/22; B60N 2/2213; B60N 2/2222; B60N 2/2245; B60N 2/643; B60N 2/667; B60N 2/68; B60N 2/809; B60N 2002/0236; A47C 7/46; A47C 7/462; A47C 7/402
See application file for complete search history.

(56) References Cited

U.S. PATENT DOCUMENTS

| | | | | |
|---|---|---|---|---|
| 3,059,970 A | * | 10/1962 | Angell | A61G 15/02 297/353 |
| 3,794,382 A | * | 2/1974 | Bloomfield | A47C 7/029 297/452.13 |
| 4,154,477 A | * | 5/1979 | Swenson | A47C 7/402 248/422 |
| 4,181,357 A | * | 1/1980 | Swenson | B60N 2/143 297/353 |
| 4,239,282 A | * | 12/1980 | White | B64D 11/0689 297/284.1 |
| 4,469,374 A | * | 9/1984 | Kashihara | B60N 2/66 297/284.4 |

(Continued)

FOREIGN PATENT DOCUMENTS

JP 2015-098194 A 5/2015

*Primary Examiner* — James M Ference
(74) *Attorney, Agent, or Firm* — Seed IP Law Group LLP

(57) ABSTRACT

A vehicle seat includes: a seat cushion; a seat back; a frame; a headrest which is provided on an upper end portion of the frame; and a reclining portion wherein: the reclining portion includes: a link supporting the seat back at a swing end section; a sector gear rotated integrally with the link; a lock unit configured to move between an engaging position and a disengaging position for releasing from the engagement with the sector gear and configured to unrotatably hold the sector gear at the engaging position; and a biasing section biasing the lock unit toward the engaging position; and the lock unit includes: a pinion gear meshing with the sector gear at the engaging position and allowing rotation of the sector gear by rotating in a state of meshing with the sector gear; and a gear holding part configured to unrotatably hold the pinion gear.

6 Claims, 18 Drawing Sheets

(56) References Cited

U.S. PATENT DOCUMENTS

| | | | | |
|---|---|---|---|---|
| 4,616,874 A * | 10/1986 | Pietsch | B60N 2/0232 | 248/394 |
| 4,632,458 A * | 12/1986 | Brown | A47C 7/402 | 248/404 |
| D289,236 S * | 4/1987 | Brauning | D6/366 | |
| 4,693,513 A * | 9/1987 | Heath | B60N 2/1839 | 297/284.11 |
| 4,787,676 A * | 11/1988 | Neve de Mevergnies | B60N 2/028 | 248/624 |
| 4,902,070 A * | 2/1990 | Casale | A47C 13/00 | 296/68.1 |
| 5,011,225 A * | 4/1991 | Nemoto | B60N 2/856 | 297/408 |
| 5,018,788 A * | 5/1991 | Cedergreen | A47C 3/16 | 297/378.1 |
| 5,123,706 A * | 6/1992 | Granzow | B60N 2/68 | 297/362.11 |
| 7,611,199 B2 * | 11/2009 | Michalak | B60N 2/0232 | 297/300.2 |
| 7,726,742 B2 * | 6/2010 | Keyser | B60N 2/0232 | 297/362 |
| 7,780,230 B2 * | 8/2010 | Serber | B60N 2/0745 | 297/216.1 |
| 8,167,370 B2 * | 5/2012 | Arakawa | B60N 2/0284 | 297/284.11 |
| 8,262,163 B2 * | 9/2012 | Wu | A47C 1/035 | 297/284.7 |
| 8,646,795 B2 * | 2/2014 | Cerreto | A61G 5/1067 | 280/250.1 |
| 8,690,249 B2 * | 4/2014 | Kang | A47C 7/402 | 297/353 |
| 8,857,908 B2 * | 10/2014 | Brncick | B60N 2/0232 | 297/284.1 |
| 8,876,206 B2 * | 11/2014 | Yamaguchi | B60N 2/4228 | 297/230.12 |
| 9,090,189 B2 * | 7/2015 | Kulkarni | B60N 2/643 | |
| 2001/0052722 A1 * | 12/2001 | Amorin | B60N 2/20 | 297/378.1 |
| 2004/0056517 A1 * | 3/2004 | Farber | A47C 4/20 | 297/17 |
| 2004/0195895 A1 * | 10/2004 | Sedlatschek | A47C 7/38 | 297/408 |
| 2005/0035642 A1 * | 2/2005 | Hake | F16B 39/282 | 297/396 |
| 2005/0189810 A1 * | 9/2005 | Wu | A47C 7/40 | 297/452.29 |
| 2006/0082208 A1 * | 4/2006 | Beermann | B60N 2/22 | 297/452.11 |
| 2006/0138848 A1 * | 6/2006 | Balensiefer | B60N 2/2866 | 297/440.16 |
| 2006/0186719 A1 * | 8/2006 | Davis | B60N 2/809 | 297/353 |
| 2006/0250008 A1 * | 11/2006 | Kohl | A47C 7/46 | 297/284.9 |
| 2006/0261656 A1 * | 11/2006 | Davis | B60N 2/2222 | 297/353 |
| 2008/0079298 A1 * | 4/2008 | Whelan | A47C 7/405 | 297/284.2 |
| 2008/0136240 A1 * | 6/2008 | Matthews | B60N 2/4235 | 297/354.1 |
| 2008/0252128 A1 * | 10/2008 | Nishikawa | B60N 2/2222 | 297/354.11 |
| 2009/0051202 A1 * | 2/2009 | Ozeki | B60N 2/12 | 297/341 |
| 2009/0236884 A1 * | 9/2009 | Lawall | B60N 2/0224 | 297/217.3 |
| 2010/0201167 A1 * | 8/2010 | Wieclawski | B60N 2/888 | 297/216.13 |
| 2010/0231013 A1 * | 9/2010 | Schlenker | B60N 2/0232 | 297/216.13 |
| 2010/0244525 A1 * | 9/2010 | Ito | B60N 2/0232 | 297/353 |
| 2011/0084531 A1 * | 4/2011 | Hida | B60N 2/0232 | 297/362 |
| 2011/0241403 A1 * | 10/2011 | Yamaguchi | B60N 2/4228 | 297/452.31 |
| 2011/0279282 A1 * | 11/2011 | Bryant | B60N 2/06 | 340/686.1 |
| 2013/0088066 A1 * | 4/2013 | Sasaki | B60N 2/16 | 297/452.38 |
| 2013/0193735 A1 * | 8/2013 | Bonk | B60N 2/0232 | 297/378.12 |
| 2013/0292960 A1 * | 11/2013 | Shyshkin | B60R 25/014 | 296/65.16 |
| 2013/0328364 A1 * | 12/2013 | Cecinas | B60N 2/20 | 297/216.1 |
| 2014/0203610 A1 * | 7/2014 | Line | B60N 2/2222 | 297/354.1 |
| 2015/0080994 A1 * | 3/2015 | Ho | A47C 7/46 | 607/115 |
| 2015/0137571 A1 * | 5/2015 | Koike | B60N 2/643 | 297/340 |
| 2015/0151653 A1 * | 6/2015 | Furuta | B60N 2/68 | 297/344.15 |
| 2015/0165935 A1 * | 6/2015 | Sachs | B60N 2/22 | 297/342 |
| 2015/0210188 A1 * | 7/2015 | Hoshi | B60N 2/68 | 297/344.12 |
| 2015/0231993 A1 * | 8/2015 | Hoshi | B60N 2/7094 | 297/344.12 |
| 2016/0096448 A1 * | 4/2016 | Line | B60N 2/2222 | 297/354.11 |
| 2018/0093590 A1 * | 4/2018 | Toda | B60N 2/0232 | |

* cited by examiner

VEHICLE SEAT

CROSS-REFERENCE TO RELATED APPLICATION(S)

This application is based upon and claims the benefit of priority from Japanese Patent Application No. 2016-196572, filed on Oct. 4, 2016, the entire contents of which are incorporated herein by reference.

BACKGROUND

1. Field of the Invention

The present invention relates to a vehicle seat including a seat back tiltable in a seat front-and-rear direction.

2. Description of the Related Art

A so-called reclining seat in which a seat back is tiltable in a seat front-and-rear direction using a lower end portion of the seat back disposed on a seat cushion side as a fulcrum is known as a vehicle seat. A reclining portion supporting the seat back in a tilt angle-variable manner typically supports the lower end portion of the seat back which becomes a tilt fulcrum, but a vehicle seat in which a reclining portion supports a portion on an upper side than the lower end portion of the seat back is also known (for example, see JP-A-2015-98194).

The vehicle seat described in JP-A-2015-98194 includes a tiltable seat back and a frame extending in a seat vertical direction on a back side of the seat back. The reclining portion supporting the seat back in a tilt angle-variable manner is disposed between the seat back and the frame, is attached to the frame, and supports a portion on an upper side than the lower end portion of the seat back.

A headrest is typically provided on the upper end portion of the seat back, and moves integrally with the seat back according to the tilt of the seat back. However, in the vehicle seat described in JP-A-2015-98194, a headrest is provided on the upper end portion of the frame, and the position of the headrest is fixed regardless of the tilt of the seat back.

In a case where the position of the headrest is fixed regardless of the tilt of the seat back, when the seat back is tilted forward, a distance between a head of a seated person and the headrest is increased. When the distance between the head of the seated person and the headrest is increased, there is a concern that an effect of cushioning impact applied to the head and a neck at the time of vehicle collision by the headrest is attenuated.

In the vehicle seat described in JP-A-2015-98194, a torque limiter is provided between a pinion gear and a motor of an actuator tilting the seat back, the torque limiter idles by overload loaded to the seat back at the time of vehicle collision, and thus the seat back is separated from the motor and is tilted backward. The distance between the head and the headrest is narrowed by tilting the seat back backward, and thus an effect of cushioning impact applied to the head and the neck by the headrest is maintained.

However, the torque limiter provided between the motor and the pinion gear or built in the motor is restricted to be relatively small with respect to a load to be managed, in relation to an installation space. For the reason, in the vehicle seat described in JP-A-2015-98194, there are concerns that a technological difficulty for appropriately managing the load is increased, a structure is complicated, and the cost is increased.

SUMMARY

The present invention has been made in consideration of the above-mentioned circumstances and an object thereof is to provide a vehicle seat capable of appropriately protecting the head and the neck with a simple configuration.

According to an aspect of the present invention, there is provided a vehicle seat including: a seat cushion; a seat back which is tiltable in a seat front-and-rear direction using a lower end portion disposed on a seat cushion side as a fulcrum; a frame which extends in a seat vertical direction on a back side of the seat back; a headrest which is provided on an upper end portion of the frame; and a reclining portion which is attached to the frame and supports a portion on an upper side than the lower end portion of the seat back in a tilt angle-variable manner, wherein: the reclining portion includes: a link swingable in the seat front-and-rear direction and supporting the seat back at a swing end section; a sector gear having a plurality of teeth circularly arrayed around a swing axis of the link and being rotated integrally with the link; a lock unit configured to move between an engaging position for engaging with the sector gear and a disengaging position for releasing from the engagement with the sector gear and configured to unrotatably hold the sector gear at the engaging position; and a biasing section biasing the lock unit toward the engaging position; and the lock unit includes: a pinion gear meshing with the sector gear at the engaging position and allowing rotation of the sector gear by rotating in a state of meshing with the sector gear; and a gear holding part configured to unrotatably hold the pinion gear.

According to the present invention, it is possible to provide a vehicle seat capable of appropriately protecting a head and a neck with a simple configuration.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
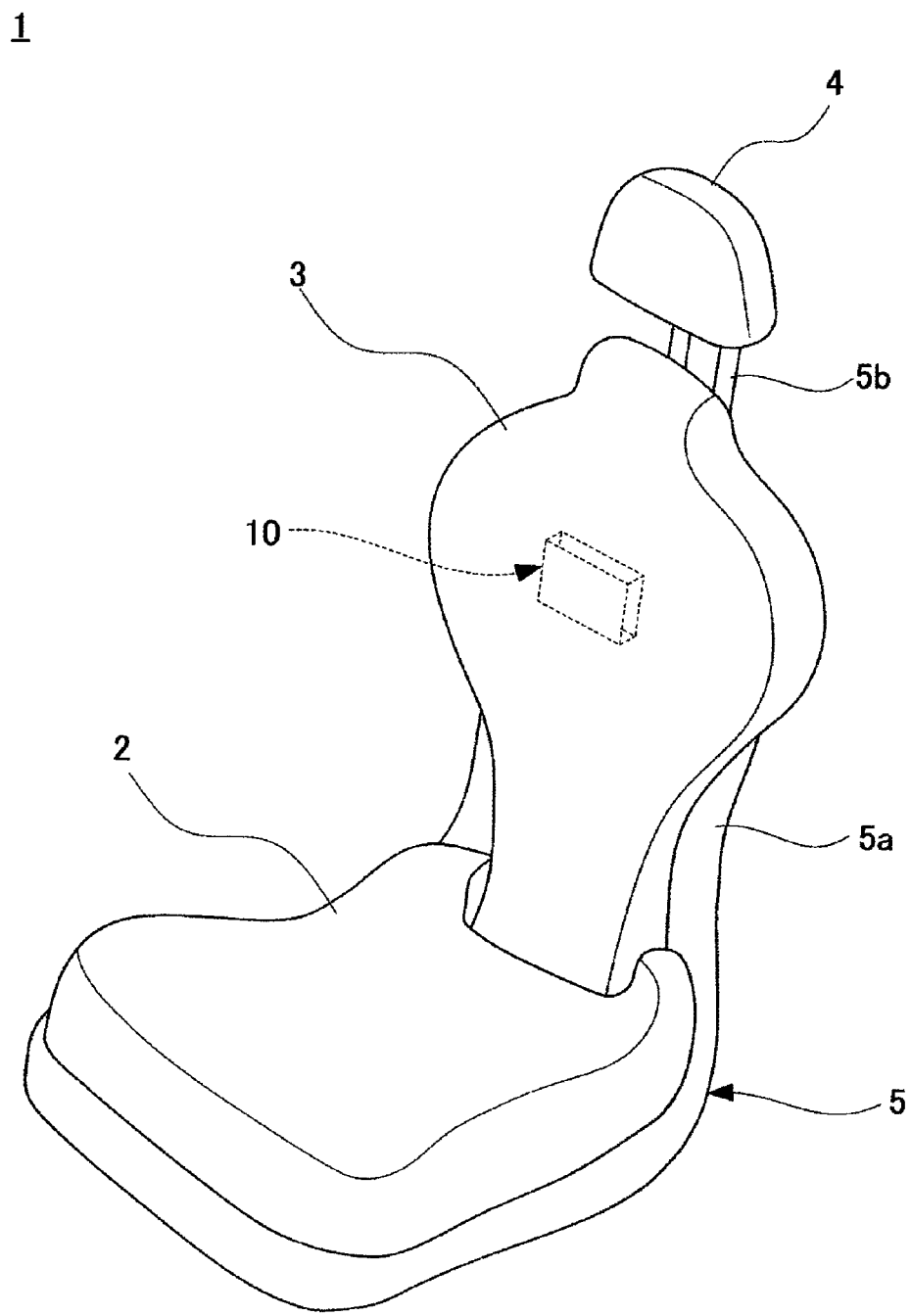
FIG. 1 is a perspective view of an example of a vehicle seat for illustrating an embodiment of the present invention.
Figure 2:
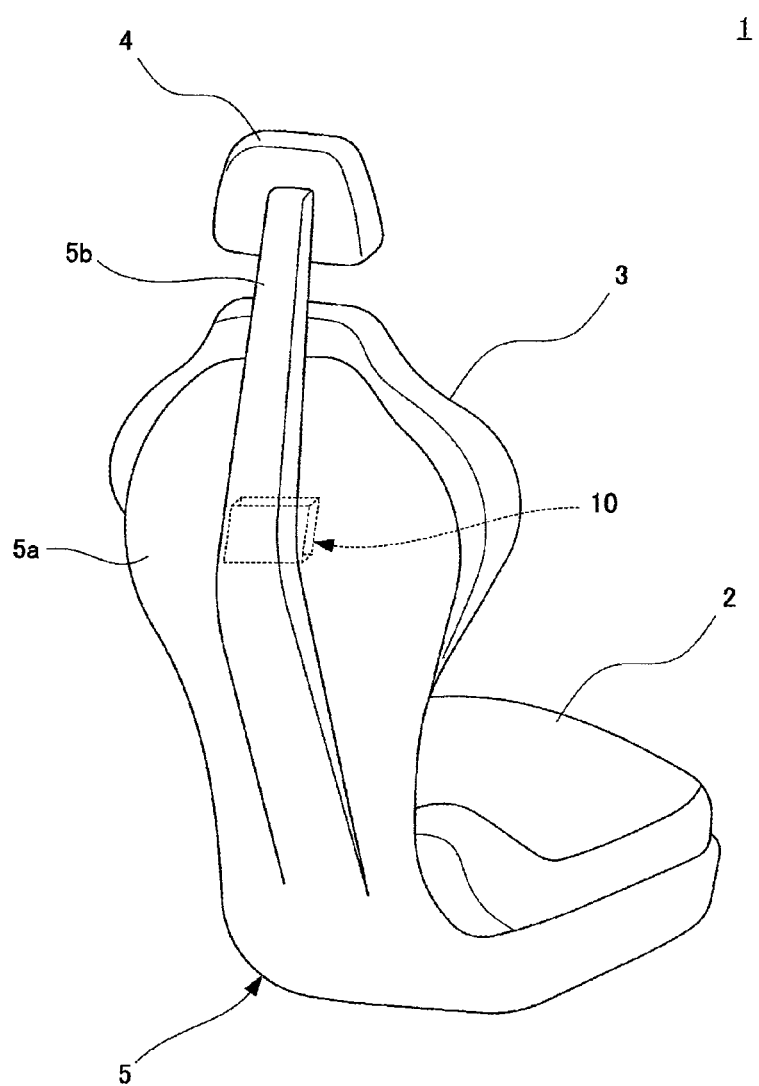
FIG. 2 is a perspective view of a back side of the vehicle seat in FIG. 1.

FIGS. 1 to 2 illustrate an example of a vehicle seat for illustrating an embodiment of the present invention.

A vehicle seat 1 shown in FIGS. 1 to 2 is a seat mounted on a vehicle such as an automobile, and includes a seat cushion 2 constituting a seat portion, a seat back 3 constituting a backrest portion, a headrest 4 supporting a head of a seated person, and a frame 5.

The frame 5 is disposed at least on a back side of the seat back 3 and extends in a vertical direction of the vehicle seat 1. In the examples shown in the drawings, the frame 5 reaches from below the seat cushion 2 to the back side of the seat back 3, and supports the seat cushion 2 and the seat back 3.

A lower end portion 3a of the seat back 3 disposed on the seat cushion 2 side is rotatably supported by the frame 5, and the seat back 3 is tiltable in a seat front-and-rear direction using the lower end portion 3a as a fulcrum.

A seat back supporting portion 5a of the frame 5 disposed on the back side of the seat back 3 is provided with a strut portion 5b protruding and extending upward from an upper end portion of the seat back 3, and the headrest 4 is attached to an upper end portion of the strut portion 5b.

As a material of the frame 5, from the viewpoint of weight reduction of the vehicle seat 1, a fiber-reinforced resin material including fiber such as glass fiber or carbon fiber can be suitably used, for example.

The vehicle seat 1 further includes a reclining portion 10 supporting the seat back 3 in a tilt angle-variable manner.

The reclining portion 10 is disposed between a portion (in an example shown in the drawings, a portion generally supporting a chest of the seated person) on an upper side than the lower end portion 3a of the seat back 3 which becomes a tilt fulcrum and the seat back supporting portion 5a, is attached to the seat back supporting portion 5a, and supports the portion on the upper side than the lower end portion 3a of the seat back 3.

Figure 3:
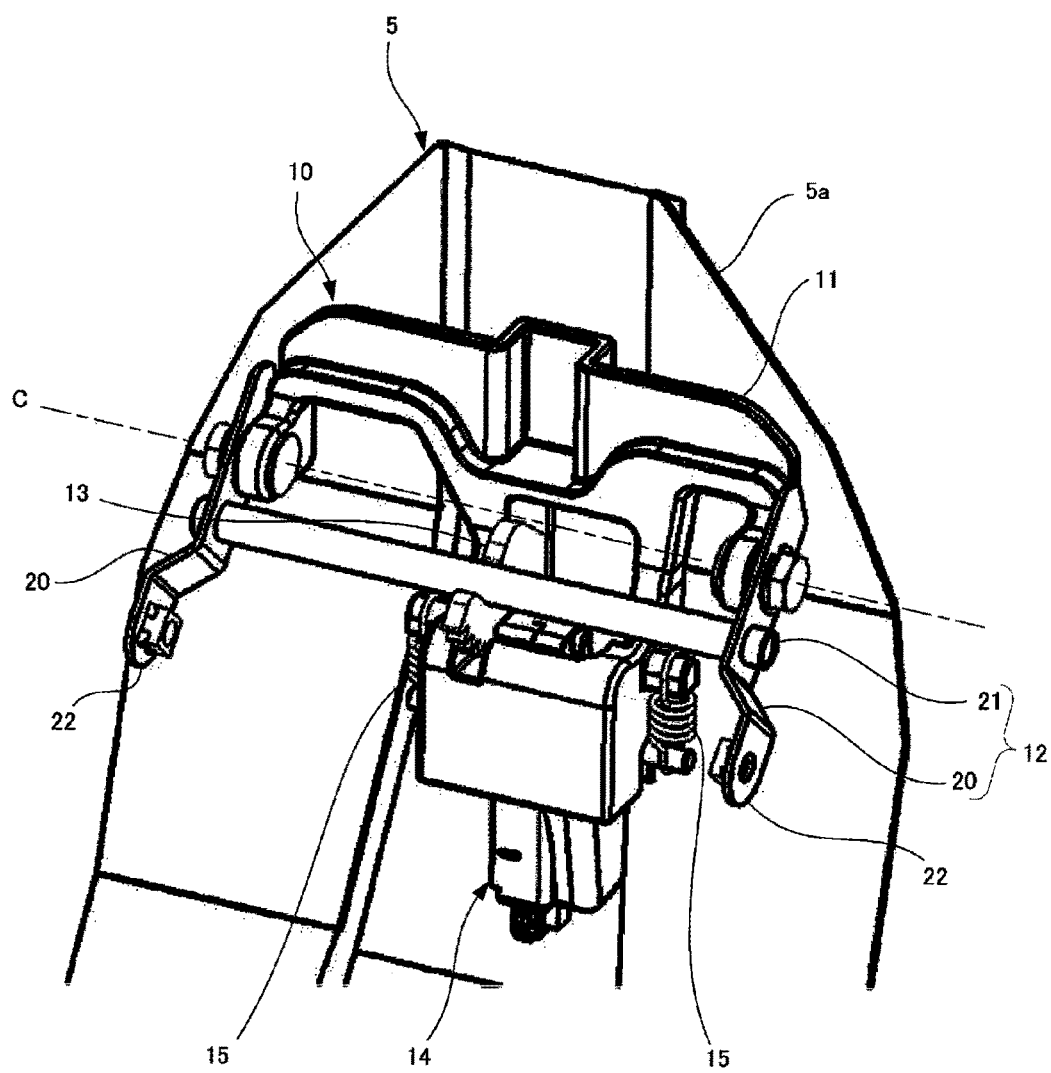
FIG. 3 is a perspective view of a reclining portion of the vehicle seat in FIG. 1.
Figure 4A:
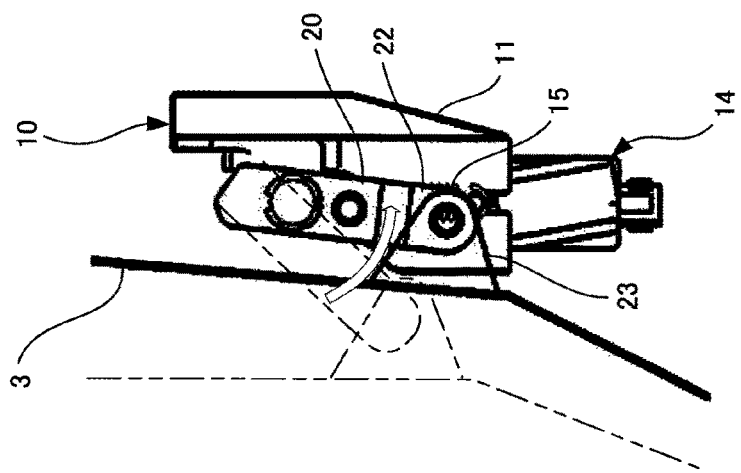
FIGS. 4A to 4C are schematic views roughly illustrating operations of a seat back and the reclining portion of the vehicle seat in FIG. 1.
Figure 4B:
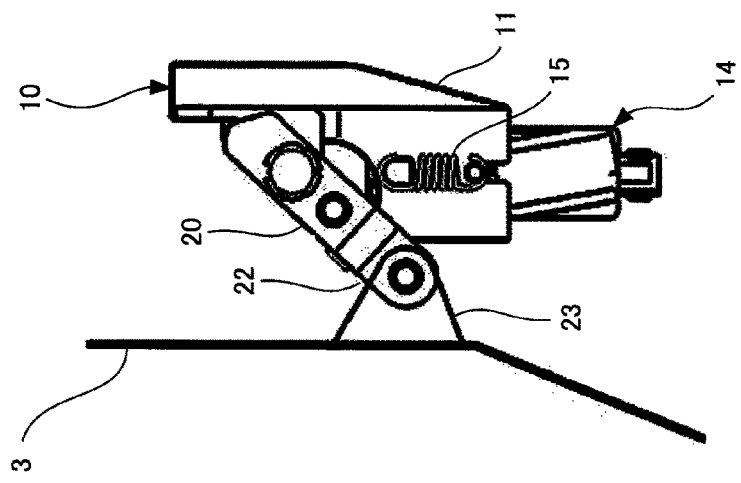
Figure 4C:
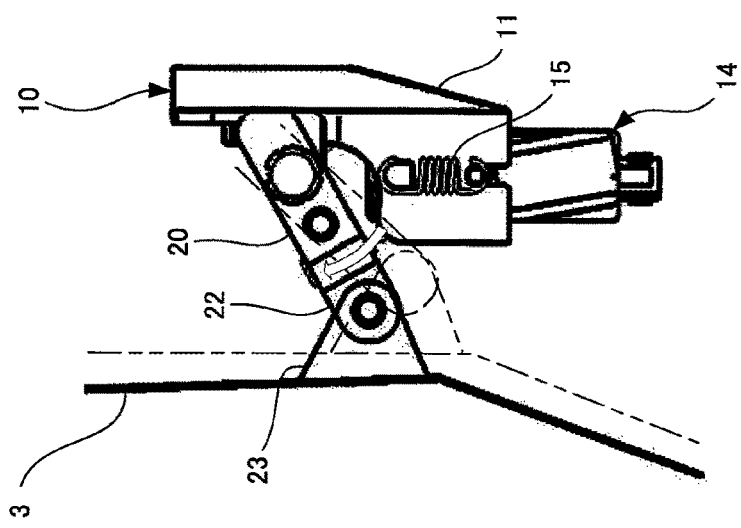
Figure 5:
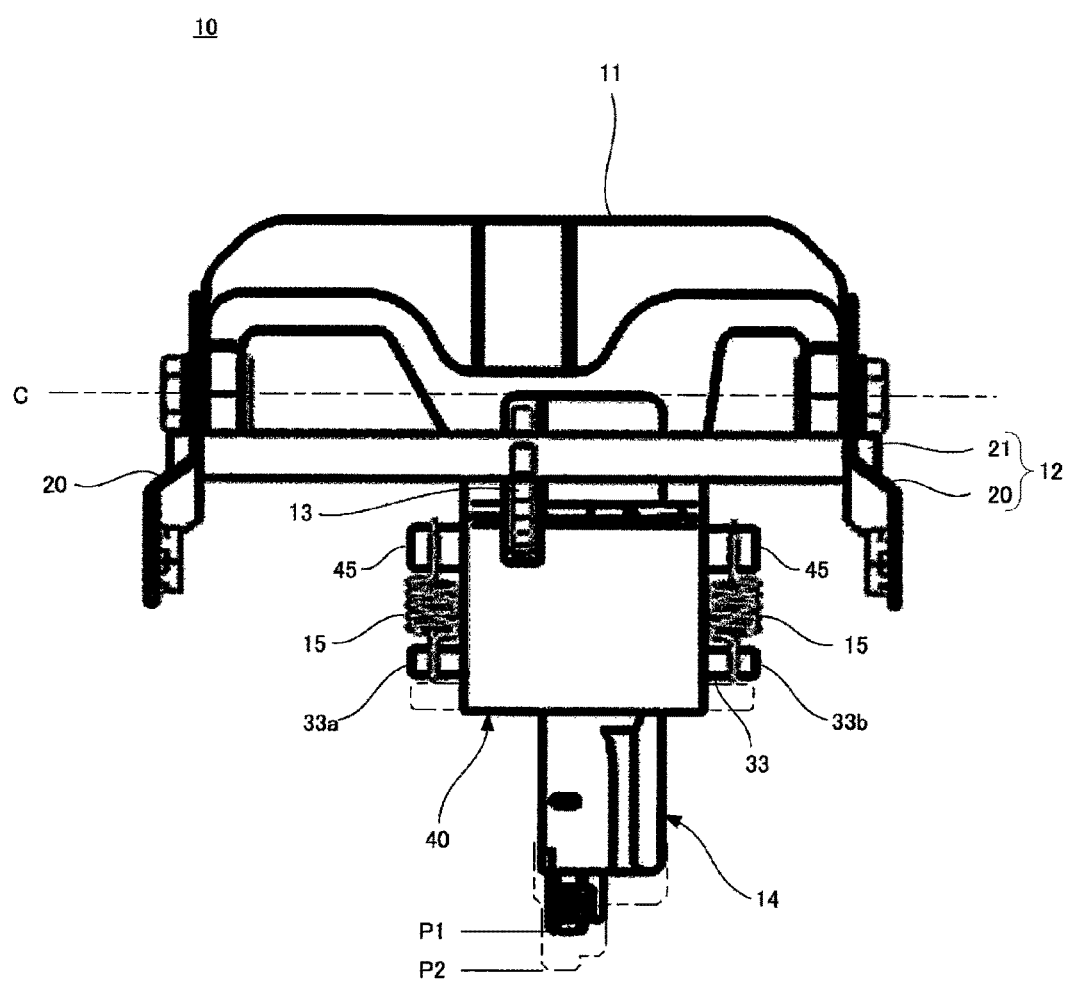
FIG. 5 is a front view of the reclining portion in FIG. 3.
Figure 6:
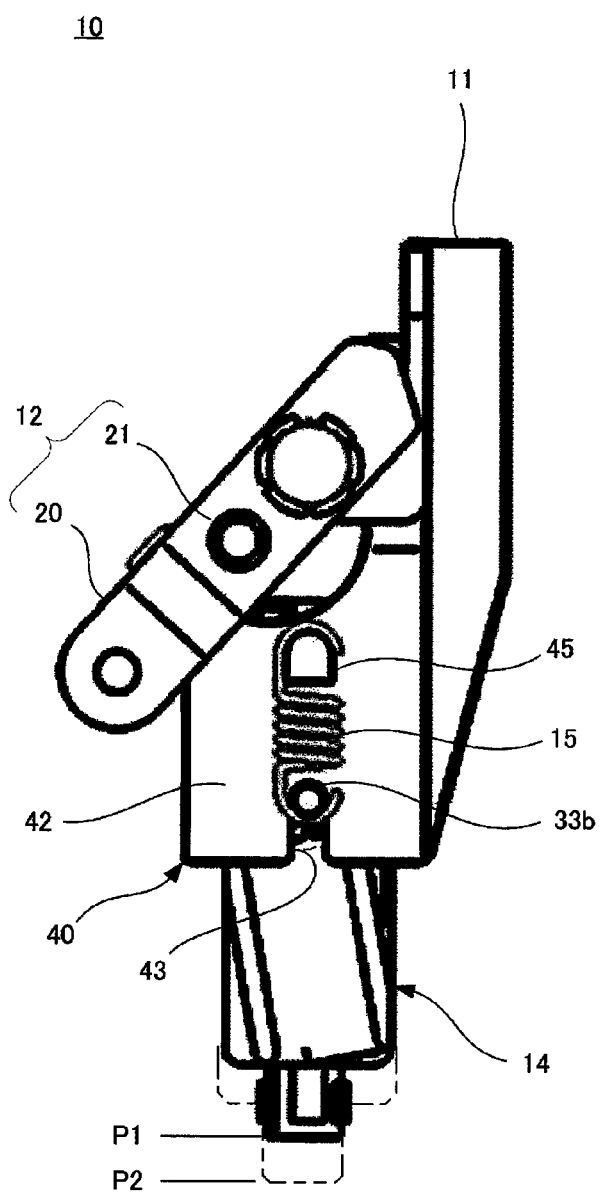
FIG. 6 is a side view of the reclining portion in FIG. 3.
Figure 7:
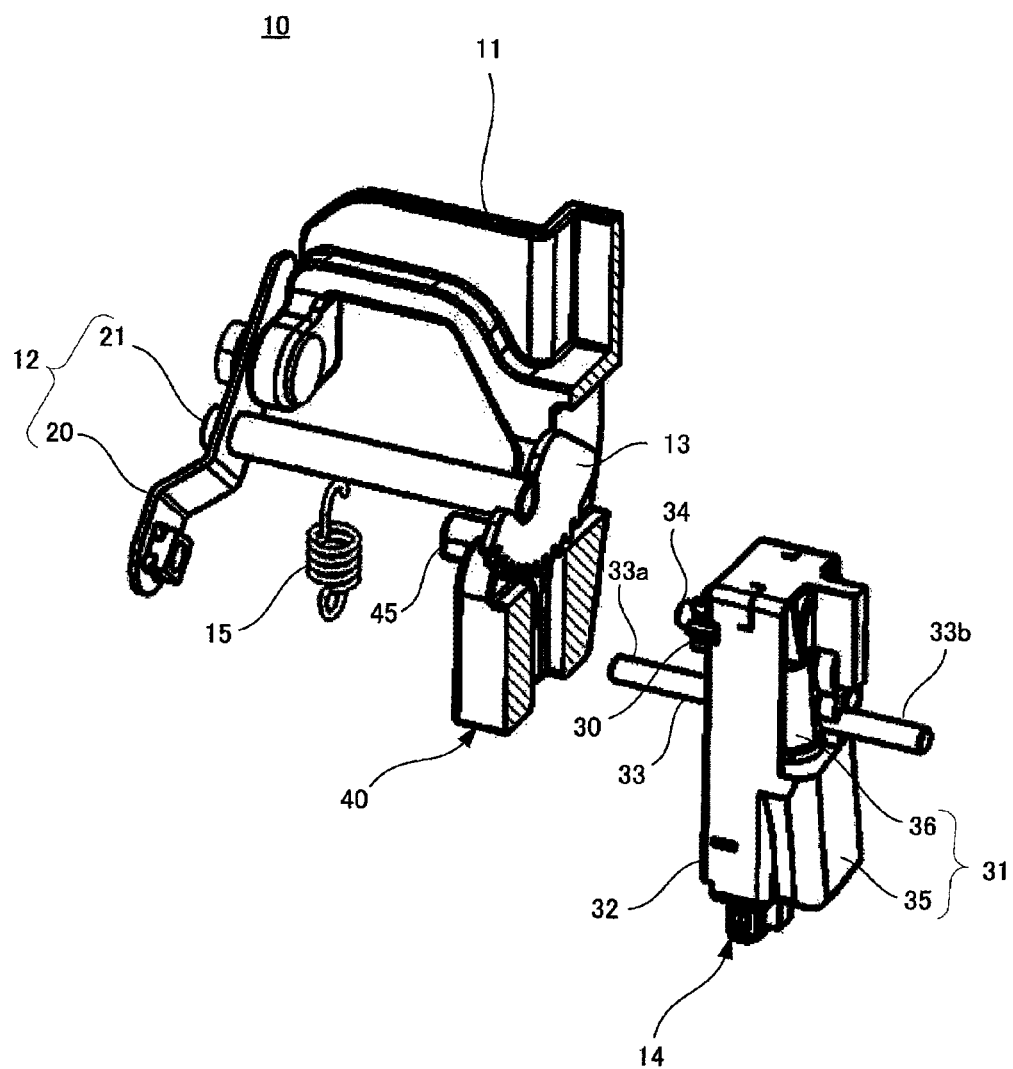
FIG. 7 is an exploded perspective view of the reclining portion in FIG. 3.
Figure 8:
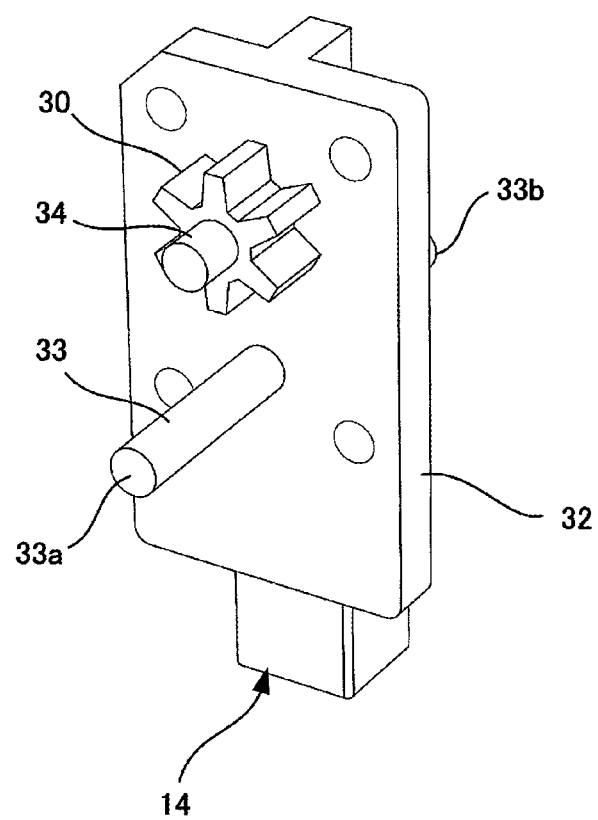
FIG. 8 is a perspective view of a lock unit of the reclining portion in FIG. 3.
Figure 9:
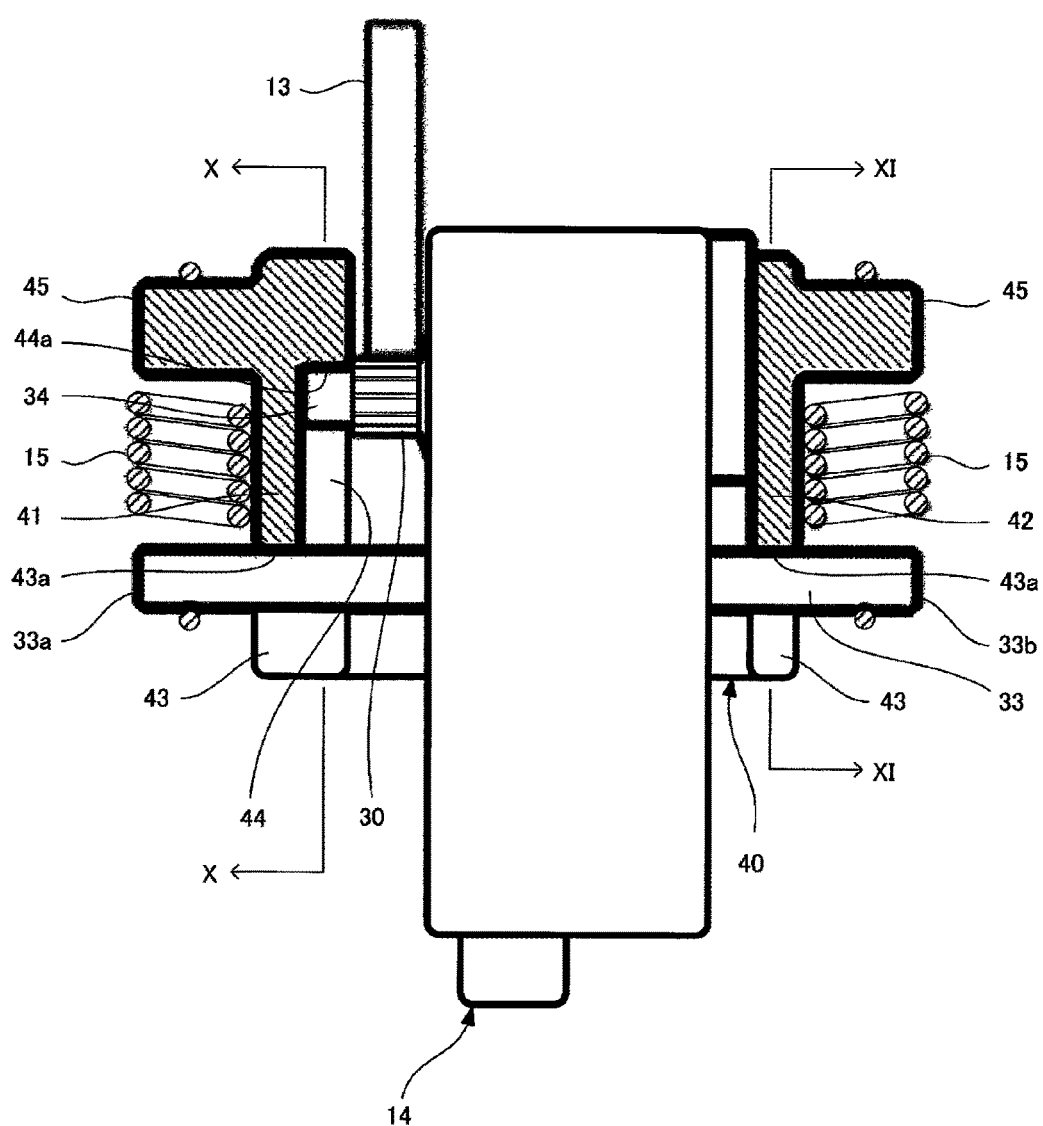
FIG. 9 is a cross-sectional view of the reclining portion in FIG. 3.
Figure 10:
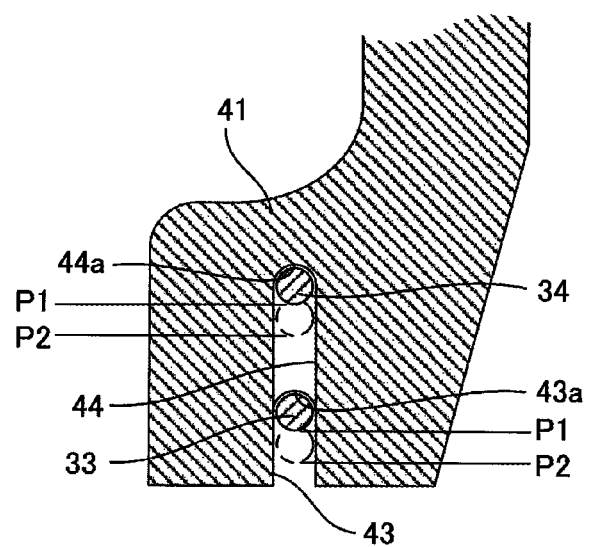
FIG. 10 is a cross-sectional view taken along the line X-X of FIG. 9.
Figure 11:
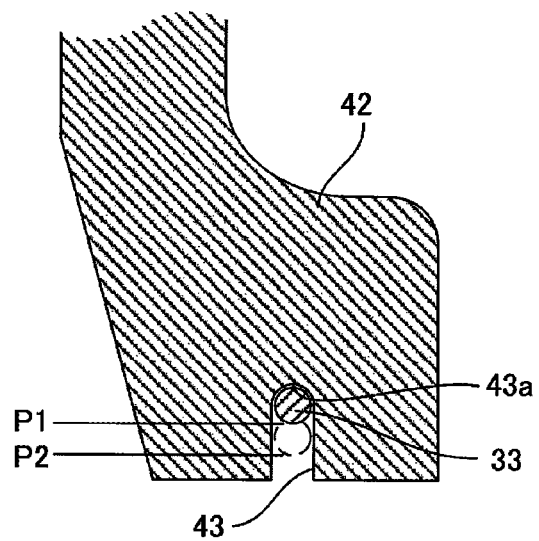
FIG. 11 is a cross-sectional view taken along the line XI-XI of FIG. 9.

FIG. 3 illustrates a configuration of the reclining portion 10, and FIGS. 4A to 4C roughly illustrate operations of the seat back 3 and the reclining portion 10.

The reclining portion 10 has a base 11, a link 12, a sector gear 13, a lock unit 14, and a pair of coil springs 15 as a biasing section.

The base 11 is attached to the seat back supporting portion 5a of the frame 5.

The link 12 includes a pair of arms 20 disposed so as to be spaced from each other in a seat width direction, and a connecting shaft 21 connecting the pair of arms 20 to each other. One end portion of each of the pair of arms 20 is supported by the base 11 so as to be swingable around a swing axis C extending the seat width direction. The other end portion (swing end section) 22 of each of the pair of arms 20 is linked to a portion on the upper side than the lower end portion 3a of the seat back 3 via a bracket 23.

As shown in FIG. 4A, when the seat back 3 is tilted forward, the pair of arms 20 are swung so that the swing end section 22 of each of the pair of arms 20 moves toward the seat front side. In addition, as shown in FIG. 4C, when the seat back 3 is tilted backward, the pair of arms 20 are swung so that the swing end section 22 of each of the pair of arms 20 moves toward the seat back side.

The pair of arms 20 are locked in a state where the seat back 3 is adjusted to have an appropriate tilt angle, and thus the seat back 3 is held at the adjusted tilt angle. Locking of the pair of arms 20 is carried out by using the sector gear 13, the lock unit 14, and the pair of coil springs 15.

FIGS. 5 to 11 illustrate the configuration of the reclining portion 10 in detail.

The sector gear 13 is fixed to the connecting shaft 21 connecting the pair of arms 20 of the link 12 to each other, and thus is rotated integrally with the pair of arms 20 around the swing axis C. The sector gear 13 has a plurality of teeth circularly arrayed around the swing axis C.

The lock unit 14 has a pinion gear 30 capable of meshing with the sector gear 13 and a gear holding part 31 capable of unrotatably holding the pinion gear 30, and the pinion gear 30 and the gear holding part 31 are assembled to a unit base 32.

The lock unit 14 is disposed below the sector gear 13, and is supported by the base 11 so as to move in the vertical direction between an engaging position P1 where the pinion gear 30 meshes with the sector gear 13 and a disengaging position P2 where the pinion gear 30 is released from the meshing with the sector gear 13.

The base 11 is provided with a housing portion 40 into which the lock unit 14 is inserted from below, and a pair of side walls 41 and 42 of the housing portion 40 sandwiching the lock unit 14 in the seat width direction are respectively provided with a guide groove 43. The guide groove 43 extends from lower ends of the side walls 41 and 42 in the vertical direction which is a moving direction of the lock unit 14, and is formed so as to penetrate the side walls 41 and 42 in the seat width direction.

Moreover, the side wall 41 is provided with a guide groove 44. The guide groove 44 extends from the lower end of the side wall 41 in the vertical direction which is the moving direction of the lock unit 14 and extends to the upper side than the guide groove 43, and in this example, the guide groove 44 is formed only on an inner surface side of the side wall 41 on the same line as the guide groove 43 of the side wall 41.

The lock unit 14 is provided with a substantially columnar engaging section 33 engaging with the pair of guide grooves 43, and a substantially columnar engaging section 34 engaging with the guide groove 44. The engaging section 33 protrudes to both sides in the seat width direction. The engaging section 34 is disposed on the upper side than the engaging section 33 so as to be spaced from the engaging section 33 in the vertical direction which is the moving direction of the lock unit 14, and protrudes to one side in the seat width direction. In this example, the engaging section 33 is formed integrally with the unit base 32, and the engaging section 34 is constituted by a rotary shaft of the pinion gear 30.

The engaging section 33 engages with the pair of guide grooves 43, the engaging section 34 engages with the guide groove 44, and thus the movement of the lock unit 14 is guided in the vertical direction. The engaging section 34 is disposed so as to be spaced from the engaging section 33 in the vertical direction, and thus the rotation of the lock unit 14 around the engaging section 33 as the rotary shaft and the rotation of the lock unit 14 around the engaging section 34 as the rotary shaft are prevented by each other.

The pair of coil springs 15 biases the lock unit 14 guided in the vertical direction upward.

Both end parts 33a and 33b of the engaging section 33 protrude from the guide groove 43 and are disposed outside of the housing portion 40, one end of the coil spring 15 on one side is locked to the end part 33a of the engaging section 33, and one end of the coil spring 15 on the other side is locked to the end part 33b of the engaging section 33. The pair of side walls 41 and 42 of the housing portion 40 are respectively provided with a spring fixing portion 45. The pair of spring fixing portions 45 are disposed on an upper side than the both end parts 33a and 33b of the engaging section 33, and the other end of each of the pair of coil springs 15 is locked to the spring fixing portion 45. Accordingly, the lock unit 14 is biased upward by the pair of coil springs 15.

The engaging section 33 of the lock unit 14 biased upward by the pair of coil springs 15 is abutted to a bottom 43a of each of the pair of guide grooves 43 of the housing portion 40, the engaging section 34 is abutted to a bottom 44a of the guide groove 44 of the housing portion 40, and thus the lock unit 14 is positioned at the engaging position P1 where the pinion gear 30 meshes with the sector gear 13.

In a state where the lock unit 14 is disposed at the engaging position P1 and the pinion gear 30 meshes with the sector gear 13, in a case where the pinion gear 30 is unrotatably held by the gear holding part 31, the rotation of the sector gear 13 meshing with the pinion gear 30 is prevented. Accordingly, the swing of the pair of arms 20 is also prevented, and the seat back 3 is held at the adjusted tilt angle.

In this example, the gear holding part 31 includes a motor 35 for rotationally driving the pinion gear 30 and a worm gear 36 for transmitting a driving force of the motor 35 to the pinion gear 30, and the pinion gear 30 is unrotatably held by the driving force of the motor 35. Moreover, the sector gear 13 meshing with the pinion gear 30 is also rotated by rotationally driving the pinion gear 30 with the motor 35. Accordingly, the pair of arms 20 are swung, and the seat back 3 is appropriately tilted.

On the other hand, in a state where the lock unit 14 is disposed at the disengaging position P2 and the pinion gear 30 is released from the meshing with the sector gear 13, the sector gear 13 can move rotatably regardless of whether the pinion gear 30 is unrotatably held by the gear holding part 31 or is rotationally driven.

FIGS. 12A to 12C and 13 illustrate operations of the reclining portion 10.

Figure 12A:
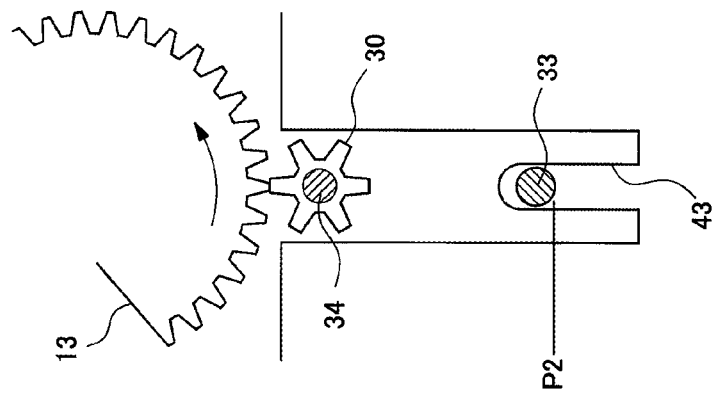
FIGS. 12A to 12C are schematic views illustrating functions of the reclining portion in FIG. 3.

As shown in FIG. 12A, in a state where the lock unit 14 biased upward by the pair of coil springs 15 is disposed at the engaging position P1 and the pinion gear 30 meshes with the sector gear 13, a load applied to the seat back 3 from the seated person is transmitted to the pinion gear 30 through the pair of arms 20 and the sector gear 13.

Figure 12B:
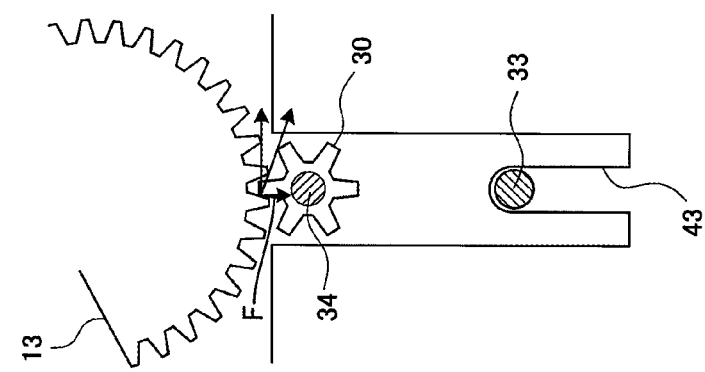

As shown in FIG. 12B, in a case where the pinion gear 30 is unrotatably held by the gear holding part 31, some of the load transmitted to the pinion gear 30 act on the pinion gear 30 as a separation force F for increasing an inter-shaft distance between the pinion gear 30 and the sector gear 13, based on an inclination of a tooth surface of each of the pinion gear 30 and the sector gear 13. The lock unit 14 is biased downward toward the disengaging position P2 by the separation force F.

Figure 12C:
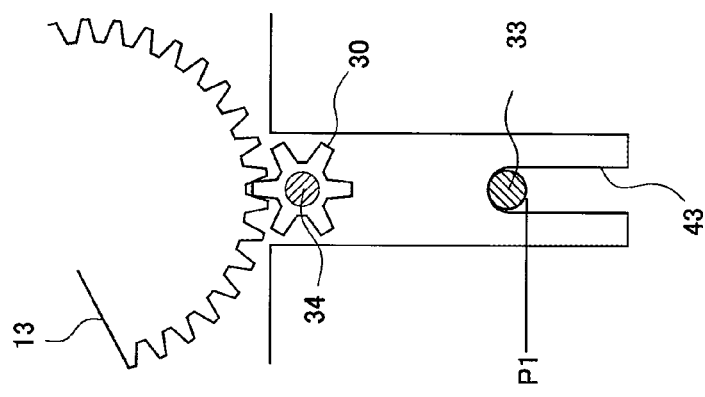

As shown in FIG. 12C, when the separation force F caused by the load applied to the seat back 3 is greater than a biasing force of the pair of coil springs 15, the lock unit 14 moves downward and is disposed at the disengaging position P2, and the pinion gear 30 is released from the meshing with the sector gear 13. Accordingly, the sector gear 13 can rotate, and the locking of the pair of arms 20 is released.

Figure 13:
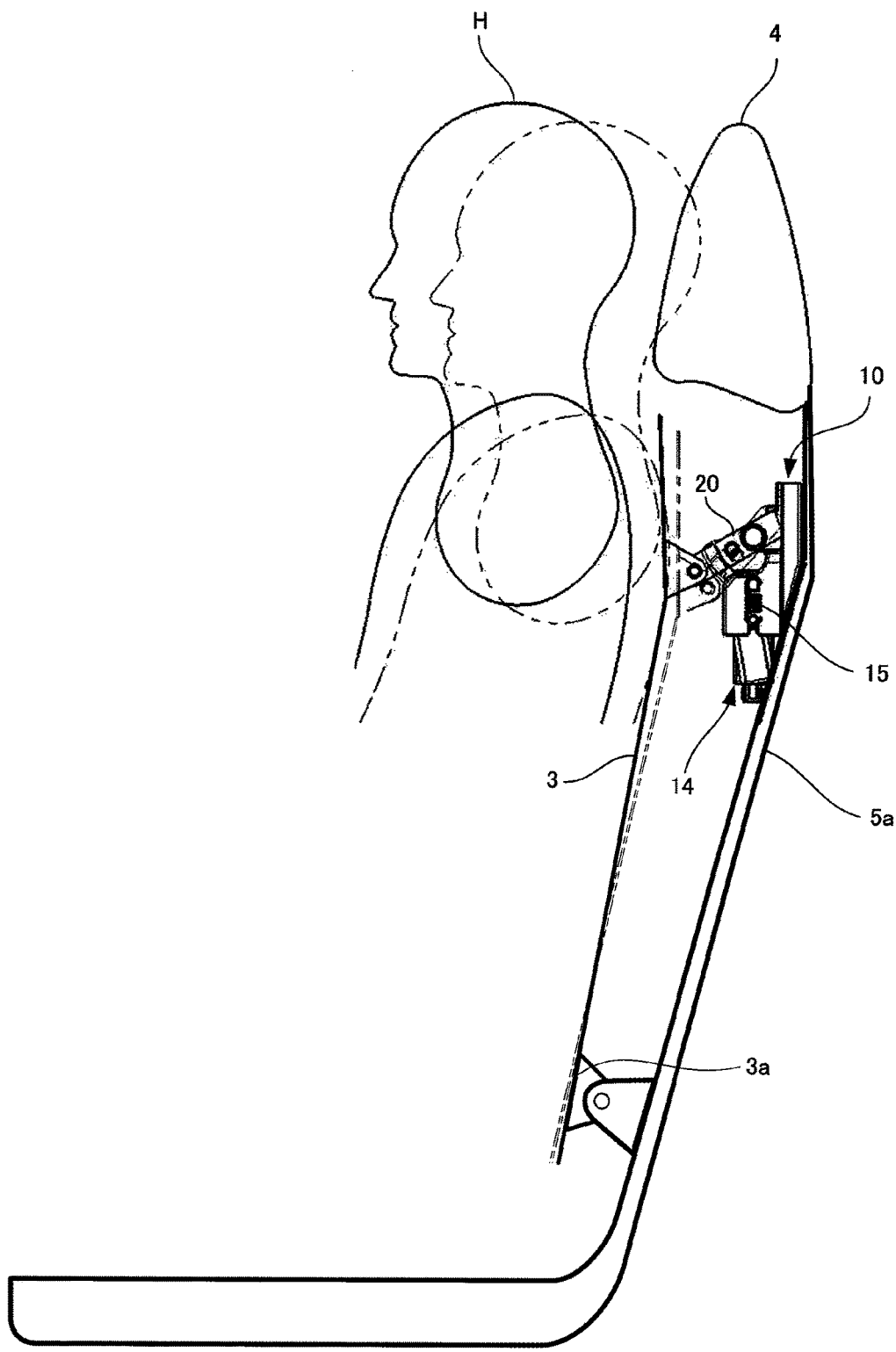
FIG. 13 is a schematic view illustrating another function of the reclining portion in FIG. 3.
Figure 14:
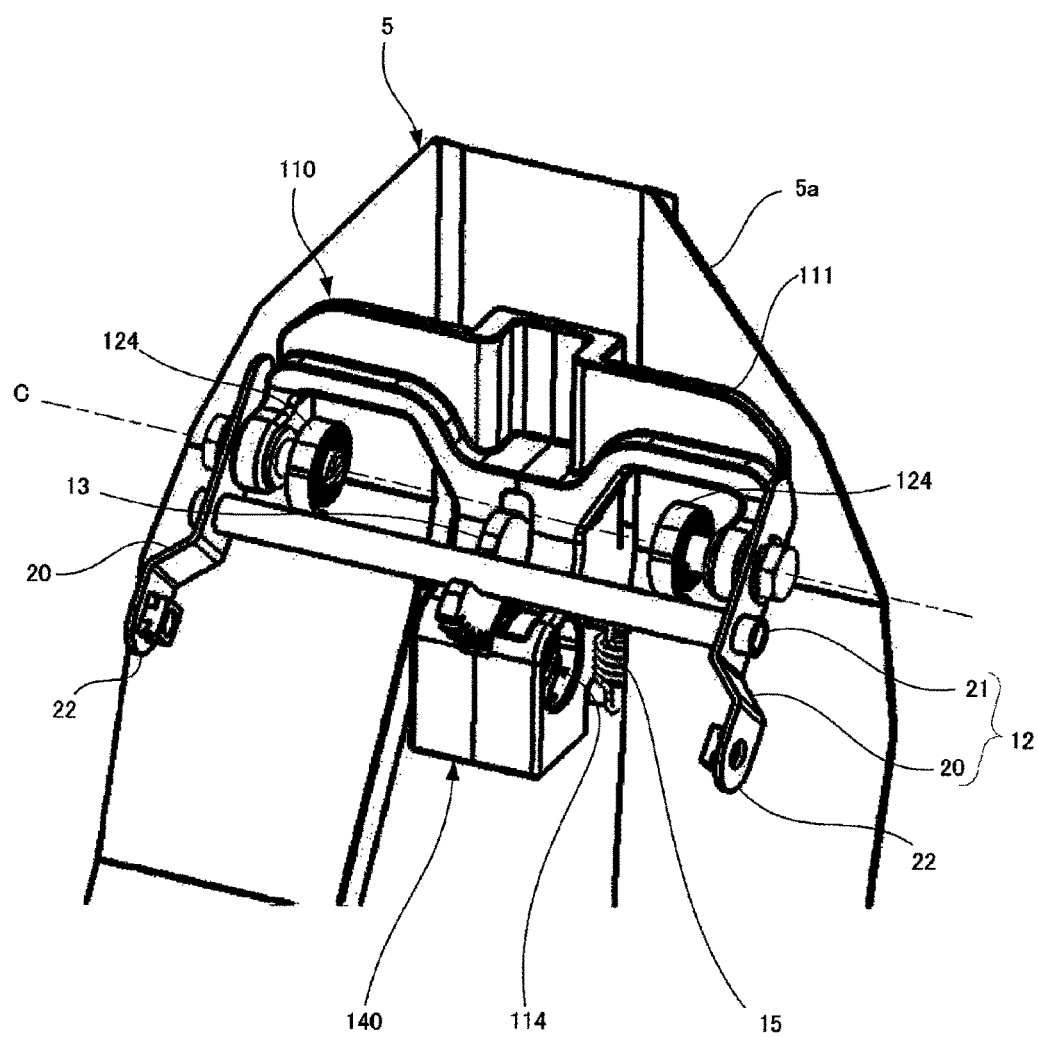
FIG. 14 is a perspective view of another example of a reclining portion of the vehicle seat for illustrating the embodiment of the present invention.
Figure 15:
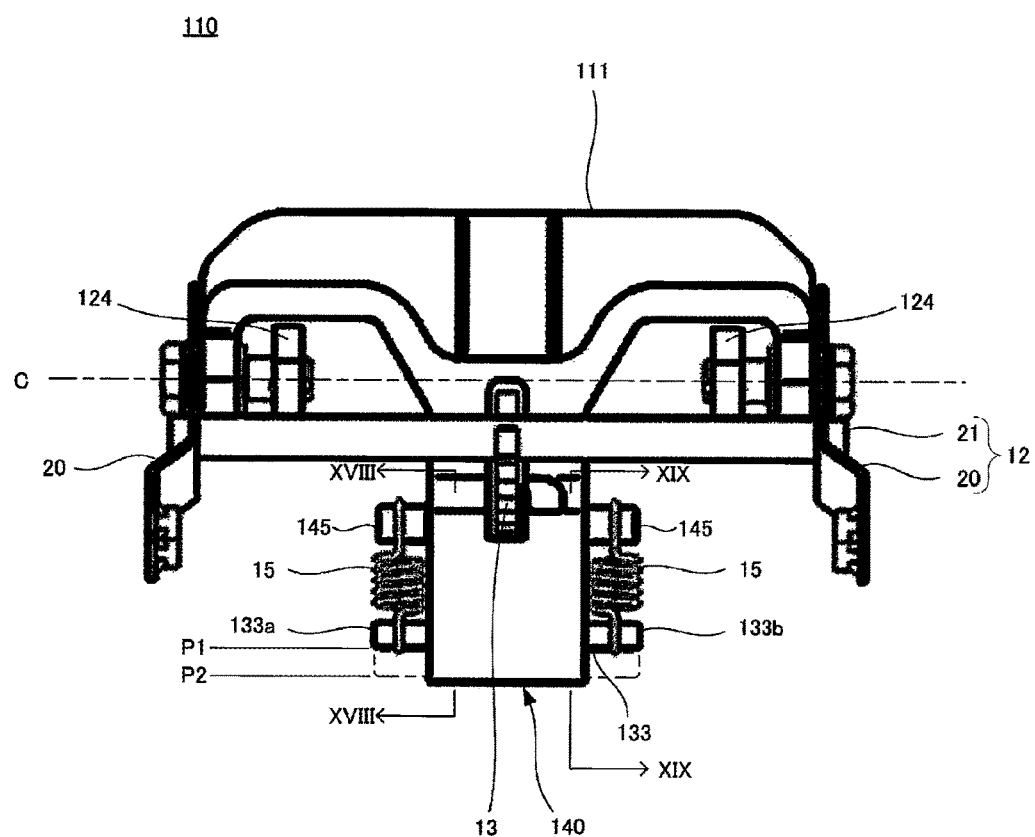
FIG. 15 is a front view of the reclining portion in FIG. 14.
Figure 16:
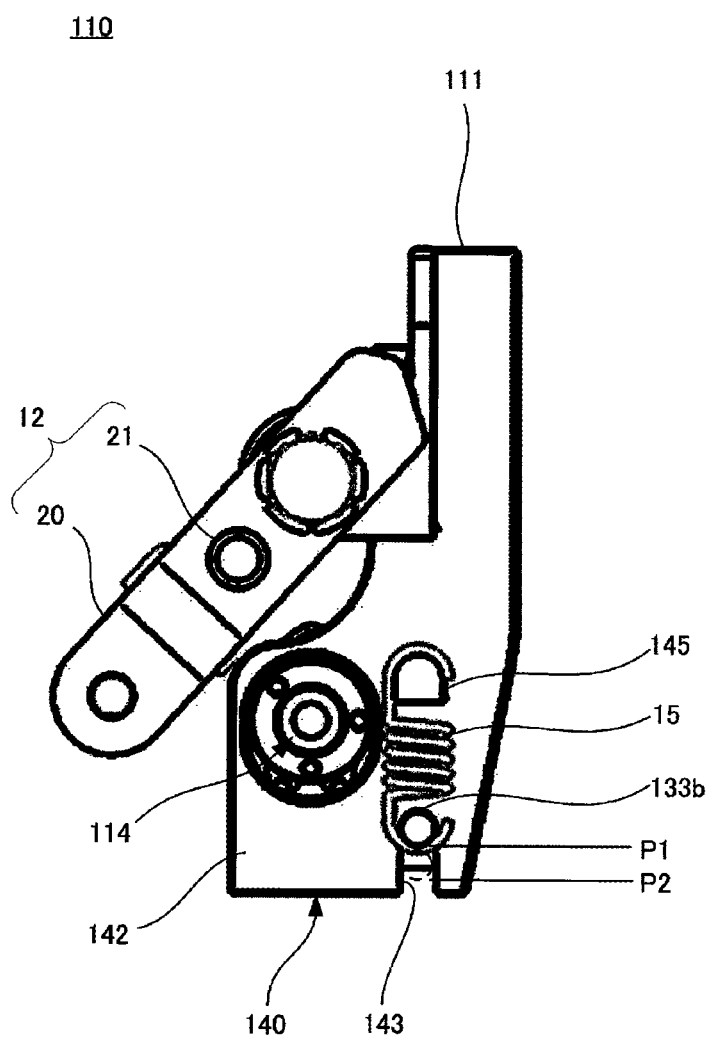
FIG. 16 is a side view of the reclining portion in FIG. 14.
Figure 17:
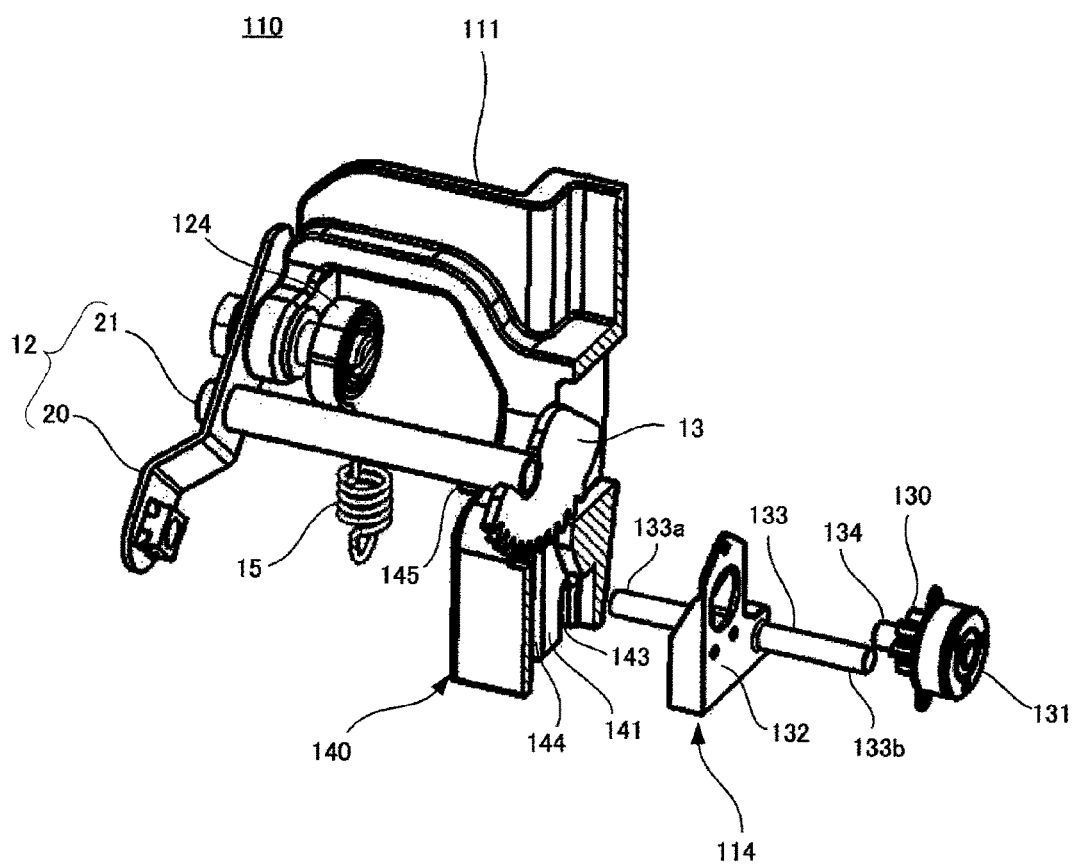
FIG. 17 is an exploded perspective view of the reclining portion in FIG. 14.
Figure 18:
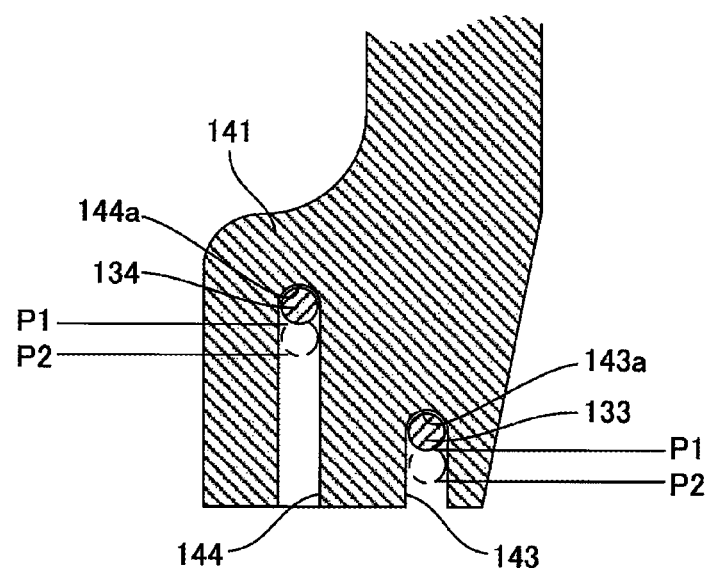
FIG. 18 is a cross-sectional view taken along the line XVIII-XVIII of FIG. 15.
Figure 19:
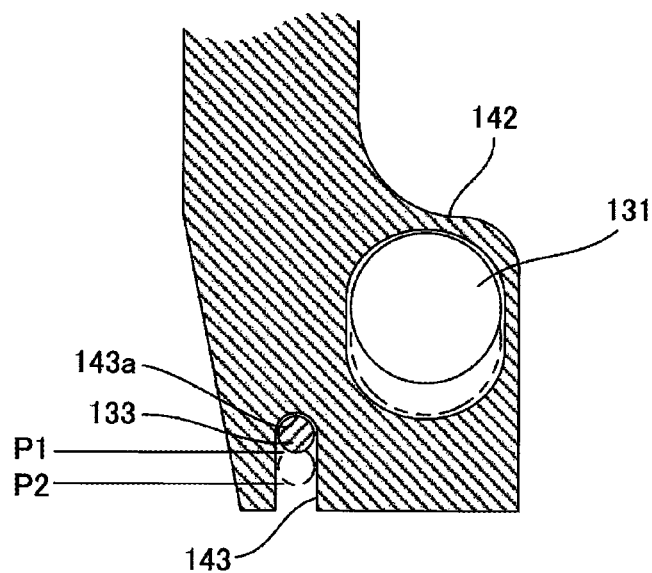
FIG. 19 is a cross-sectional view taken along the line XIX-XIX of FIG. 15.

As shown in FIG. 13, in a case where overload is applied to the seat back 3 from a seated person H, for example, at the time of vehicle collision or the like, the locking of the pair of arms 20 is released and the seat back 3 is tilted backward according to the operations described above of the reclining portion 10. The distance between the head of the seated person H and the headrest 4 is narrowed by tilting the seat back 3 backward. Therefore, an effect of cushioning impact applied to the head and the neck by the headrest 4 can be maintained. Moreover, since the distance between the head and the headrest 4 is automatically narrowed at the time of vehicle collision, it is possible to enhance comfortability by setting as a distance corresponding to the preference of the seated person in ordinary time.

In the vehicle seat 1 described above, the management of the load causing the backward tilting of the seat back 3 in the overload applied to the seat back 3 is performed by the pair of coil springs 15 biasing the lock unit 14 including the motor 35 and the pinion gear 30, instead of the torque limiter in the related art provided between the motor 35 and the pinion gear 30 or built in the motor 35. Therefore, it is possible to manage the load with a simpler configuration than the torque limiter, and since the restriction on the installation space is relieved, it is also easy to use a coil spring having a size appropriate for a load to be managed and the load can be appropriately managed.

In the vehicle seat 1, the gear holding part 31 of the lock unit 14 includes the motor 35 and the pinion gear 30 is held in an electromagnetically unrotatable manner with the motor 35. However, the pinion gear 30 may be held in a mechanically unrotatable manner.

FIGS. 14 to 19 illustrate other examples of the reclining portion of the vehicle seat for illustrating the embodiment of the present invention. Elements common with the vehicle seat 1 and the reclining portion 10 described above are denoted by same reference numerals, and the descriptions thereof will be omitted or be simplified.

Similar to the reclining portion 10 of the vehicle seat 1 described above, a reclining portion 110 of the vehicle seat shown in FIGS. 14 to 19 is disposed between a portion on an upper side than the lower end portion 3a of the seat back 3 which becomes a tilt fulcrum and the seat back supporting portion 5a of the frame 5, is attached to the seat back supporting portion 5a, and supports the portion on the upper side than the lower end portion 3a of the seat back 3.

The reclining portion 110 includes: a base 111 which is fixed to the seat back supporting portion 5a of the frame 5; the link 12 which has the pair of arms 20 supported by the base 111 so as to be swingable around the swing axis C extending in the seat width direction; the sector gear 13 which is rotated integrally with the pair of arms 20 around the swing axis C; a lock unit 114; and the pair of coil springs 15.

The pair of arms 20 are locked in a state where the seat back 3 is adjusted to have an appropriate tilt angle, and thus the seat back 3 is held at the adjusted tilt angle. Locking of the pair of arms 20 is carried out by using the sector gear 13, the lock unit 114, and the pair of coil springs 15.

In this example, the pair of arms 20 are biased by a seat back biasing member 124 formed of a spiral spring or the like, the locking of the pair of arms 20 is released, and thus the seat back 3 is automatically made stand so as to be in the most forwardly tilted state.

The lock unit 114 has a pinion gear 130 capable of meshing with the sector gear 13 and a gear holding part 131 capable of unrotatably holding the pinion gear 130, and the pinion gear 130 and the gear holding part 131 are assembled to a unit base 132. The lock unit 114 is supported by the base 111 so as to move in the vertical direction between the engaging position P1 where the pinion gear 130 meshes with the sector gear 13 and the disengaging position P2 where the pinion gear 130 is released from the meshing with the sector gear 13.

The base 111 is provided with a housing portion 140 into which the lock unit 114 is inserted, and a pair of side walls 141 and 142 of the housing portion 140 sandwiching the lock unit 114 in the seat width direction are respectively provided with a guide groove 143. The pair of guide grooves 143 extend from lower ends of the side walls 141 and 142 in the vertical direction which is a moving direction of the lock unit 114.

Moreover, the side wall 141 is provided with a guide groove 144. The guide groove 144 also extends from the lower end of the side wall 141 in the vertical direction and extends to an upper side than the guide groove 143. In this example, the guide groove 144 is formed on the different line from the guide groove 143 of the side wall 141.

The lock unit 114 is provided with a substantially columnar engaging section 133 engaging with the pair of guide grooves 143, and a substantially columnar engaging section 134 engaging with the guide groove 144. The engaging section 133 protrudes to both sides in the seat width direction and is formed integrally with the unit base 132. The engaging section 134 is disposed on the upper side than the engaging section 133, protrudes to one side in the seat width direction, and is configured by a rotary shaft of the pinion gear 130.

The engaging section 133 engages with the pair of guide grooves 143, the engaging section 134 engages with the guide groove 144, and thus the movement of the lock unit 114 is guided in the vertical direction. The engaging section 134 is disposed so as to be spaced from the engaging section 133 in the vertical direction, and thus the rotation of the lock unit 114 around the engaging section 133 as the rotary shaft and the rotation of the lock unit 114 around the engaging section 134 as the rotary shaft are prevented by each other.

Both end parts 133a and 133b of the engaging section 133 protrude from the guide groove 143 and are disposed outside of the housing portion 140, one end of the coil spring 15 on one side is locked to the end part 133a of the engaging section 133, and one end of the coil spring 15 on the other side is locked to the end part 133b of the engaging section 133. The pair of side walls 141 and 142 of the housing portion 140 are respectively provided with a spring fixing portion 145, and the other end of each of the pair of coil springs 15 is locked to the spring fixing portion 145. Accordingly, the lock unit 14 is biased upward by the pair of coil springs 15.

In this example in which the guide groove 144 is formed on the different line from the guide groove 143 of the side wall 141, the pair of side walls 141 and 142 of the housing portion 140 may be respectively provided with a guide groove 144, both end parts of the engaging section 134 constituted by the rotary shaft of the pinion gear 130 may protrude from the guide groove 144 to be disposed outside of the housing portion 140, and the pair of the coil springs 15 may be locked to the both end parts of the engaging section 134.

The engaging section 133 of the lock unit 114 biased upward by the pair of coil springs 15 is abutted to a bottom 143a of each of the pair of guide grooves 143 of the housing portion 140, the engaging section 134 is abutted to a bottom 144a of the guide groove 144 of the housing portion 140, and thus the lock unit 114 is positioned at the engaging position P1 where the pinion gear 130 meshes with the sector gear 13.

In a state where the lock unit 114 is disposed at the engaging position P1 and the pinion gear 130 meshes with the sector gear 13, in a case where the pinion gear 130 is unrotatably held by the gear holding part 131, the rotation of the sector gear 13 meshing with the pinion gear 130 is prevented. Accordingly, the swing of the pair of arms 20 is also prevented, and the seat back 3 is held at the adjusted tilt angle.

In this example, the gear holding part 131 is constituted by a brake which can hold the pinion gear 130 in a mechanically unrotatable manner and can be switched by a manual operation so as to allow the rotation of the pinion gear 130 as necessary. As a brake, a brake using frictional force such as a disc brake or a drum brake, or a ratchet-type brake used in a vertical adjustment mechanism of an automobile seat is exemplified.

The reclining portion 110 functions similar to the reclining portion 10 described above, and when the separation force which is caused by the load applied to the seat back 3 and acts on the pinion gear 130 is greater than the biasing force of the pair of coil springs 15, the lock unit 114 moves downward and is disposed at the disengaging position P2, and the pinion gear 130 is released from the meshing with the sector gear 13. Accordingly, the sector gear 13 can rotate, and the locking of the pair of arms 20 is released.

In a case where overload is applied to the seat back 3 from the seated person, for example, at the time of vehicle collision or the like, the locking of the pair of arms 20 is released and the seat back 3 is tilted backward according to the operations described above of the reclining portion 110. The distance between the head of the seated person and the headrest is narrowed by tilting the seat back 3 backward. Therefore, an effect of cushioning impact applied to the head and the neck by the headrest can be maintained. Moreover, since the distance between the head and the headrest 4 is automatically narrowed at the time of vehicle collision, it is possible to enhance comfortability by setting as a distance corresponding to the preference of the seated person in ordinary time.

Since the management of the load causing the backward tilting of the seat back 3 in the overload applied to the seat back 3 is performed by the pair of coil springs 15 biasing the lock unit 114, it is possible to manage the load with a simpler configuration than the torque limiter, and since the restriction on an installation space is relieved, it is also easy to use a coil spring having a size appropriate for a load to be managed and thus the load can be appropriately managed.

What is claimed is:

1. A vehicle seat comprising:
   a seat cushion;
   a seat back which is tiltable in a seat front-and-rear direction using a lower end portion disposed on a seat cushion side as a fulcrum;
   a frame which extends in a seat vertical direction on a back side of the seat back;

a headrest which is provided on an upper end portion of the frame; and a reclining portion which is attached to the frame and supports a portion on an upper side of the seat back above the lower end portion of the seat back in a tilt angle-variable manner, wherein:

the reclining portion includes:

a link swingable in the seat front-and-rear direction and supporting the seat back at a swing end section;

a sector gear having a plurality of teeth circularly arrayed around a swing axis of the link and being rotated integrally with the link;

a lock unit configured to move between an engaging position for engaging with the sector gear and a disengaging position for releasing from the engagement with the sector gear and configured to unrotatably hold the sector gear at the engaging position; and a biasing section biasing the lock unit toward the engaging position; and the lock unit includes:

a pinion gear meshing with the sector gear at the engaging position and allowing rotation of the sector gear by rotating in a state of meshing with the sector gear; and a gear holding part configured to unrotatably hold the pinion gear.

2. The vehicle seat according to claim 1, wherein:

the reclining portion includes a base movably supporting the lock unit in a moving direction of the lock unit moving between the engaging position and the disengaging position;

the lock unit has a first engaging section and a second engaging section provided so as to protrude in an axial direction of the swing axis and to be spaced from each other in the moving direction; and the base has a plurality of guide grooves extending in the moving direction and engaging with the first engaging section and the second engaging section.

3. The vehicle seat according to claim 2, wherein:

the first engaging section protrudes to sides of a housing in the axial direction of the swing axis;

the first engaging section includes end parts that protrude from the guide groove; and the biasing section has a pair of biasing members being disposed so as to sandwich the lock unit in the axial direction of the swing axis and being locked to the end parts of the first engaging section.

4. The vehicle seat according to claim 2, wherein the first engaging section or the second engaging section acts as a rotary shaft of the pinion gear.

5. The vehicle seat according to claim 1, wherein the gear holding part includes a motor for rotationally driving the pinion gear and holds the pinion gear in an electromagnetically unrotatable manner with a driving force of the motor.

6. The vehicle seat according to claim 1, wherein the gear holding part is a brake holding the pinion gear in a mechanically unrotatable manner and configured to rotate the pinion gear as necessary.

* * * * *